US010696481B2

United States Patent
Batchelder et al.

(10) Patent No.: US 10,696,481 B2
(45) Date of Patent: Jun. 30, 2020

(54) POSITION LIMITER ASSEMBLY FOR A CONVEYOR BELT

(71) Applicant: Laitram, L.L.C., Harahan, LA (US)

(72) Inventors: Jeff Batchelder, Hesperia, MI (US); Michael Hendrik DeGroot, Rockford, MI (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/099,881

(22) PCT Filed: May 17, 2017

(86) PCT No.: PCT/US2017/033043
§ 371 (c)(1),
(2) Date: Nov. 8, 2018

(87) PCT Pub. No.: WO2017/205135
PCT Pub. Date: Nov. 30, 2017

(65) Prior Publication Data
US 2019/0152706 A1     May 23, 2019

Related U.S. Application Data

(60) Provisional application No. 62/340,828, filed on May 24, 2016.

(51) Int. Cl.
*B65G 15/60* (2006.01)
*B65G 45/16* (2006.01)
*B65G 45/00* (2006.01)
*B65G 39/16* (2006.01)

(52) U.S. Cl.
CPC ............ *B65G 15/60* (2013.01); *B65G 39/16* (2013.01)

(58) Field of Classification Search
None
See application file for complete search history.

(56) References Cited

U.S. PATENT DOCUMENTS

| 4,489,823 | A | 12/1984 | Gordon |
| 4,533,036 | A * | 8/1985 | Gordon .................. B65G 45/16 15/256.51 |
| 5,659,851 | A | 8/1997 | Moe et al. |
| 6,360,875 | B1 * | 3/2002 | Altemus, Jr. .......... B65G 45/16 15/256.5 |

(Continued)

FOREIGN PATENT DOCUMENTS

JP     2002037433 A     2/2002

OTHER PUBLICATIONS

Partial Supplementary European Search Report , European Patent Application No. 17803303.1, dated Jan. 7, 2020, European Patent Office, Munich, Germany.

*Primary Examiner* — Kavel Singh
(74) *Attorney, Agent, or Firm* — Catherine M. Bishop

(57) ABSTRACT

A conveyor employs a low-tension, direct drive conveyor belt, and a position limiter assembly. The position limiter assembly includes a primary position limiter and a secondary position limiter. The primary position limiter provides line of contact engagement with the conveyor belt while the secondary position limiter has an extended, static limiting surface for engaging the conveyor belt if the conveyor belt disengages from a drive sprocket prior to the line of contact with the primary position limiter.

12 Claims, 4 Drawing Sheets

(56) References Cited

U.S. PATENT DOCUMENTS

| | | | |
|---|---|---|---|
| 6,926,133 B2 * | 8/2005 | Kolodziej | B65G 45/12 198/493 |
| 7,549,532 B2 * | 6/2009 | Ostman | B65G 45/12 198/497 |
| 7,850,562 B2 | 12/2010 | Degroot | |
| 2006/0049023 A1 | 3/2006 | Dietsch et al. | |
| 2013/0264173 A1 | 10/2013 | Felton et al. | |
| 2015/0210475 A1 | 7/2015 | Batchelder et al. | |
| 2015/0210478 A1 | 7/2015 | Batchelder et al. | |

* cited by examiner

POSITION LIMITER ASSEMBLY FOR A CONVEYOR BELT

RELATED APPLICATIONS

The present application claims priority to U.S. Provisional Patent Application Ser. No. 62/340,828, filed May 24, 2016, and entitled "Position Limiter Assembly for a Conveyor Belt", the contents of which are herein incorporated by reference.

BACKGROUND OF THE INVENTION

The invention relates generally to power-driven conveyors and, more particularly, to thermoplastic, toothed endless belts driven by sprockets.

Position limiters, such as described in U.S. Pat. No. 7,850,562, the contents of which are incorporated herein by reference, are used in low tension, positive drive belting systems to ensure proper engagement of the conveyor belt and drive sprocket by controlling the position of the conveyor belt during the drive tooth hand-off process. A position limiter may be disposed against the conveyor belt near the exit point. Examples of position limiters include scrapers, rollers and shoes.

Current position limiters are fixed to a mounting shaft, which may trap dirt and debris and inhibit disassembly and-or replacement of the position limiter. In addition, current position limiters are generally placed where the conveyor belt would naturally fall away from the drive sprocket when no pretension is applied, which is typically at 165° of wrap from where the belt enters the drive sprocket. The position limiter thus competes for the same space as a belt scraper, if used. Further, the position limiter must be axially aligned with the drive sprockets, requiring locking collars or fasteners that can become harborage zones for bacteria, thus presenting risks to food safety.

SUMMARY

A position limiter assembly for a positively-driven, low tension conveyor belt includes a primary position limiter and a second position limiter mounted on a mounting shaft. The position limiter assembly can be mounted to a conveyor frame to ensure proper engagement between drive elements of a conveyor belt and a drive during operation.

According to one aspect, a position limiter assembly for a conveyor belt comprises a mounting shaft extending from a first end to a second end, a roller limiter mounted on the mounting shaft and a snap-on position limiter mounted on the mounting shaft adjacent to the roller limiter.

According to another aspect, a position limiter assembly for a conveyor belt comprises a mounting shaft extending from a first end to a second end, a primary position limiter comprising a freely-rotating roller mounted on the mounting shaft and a secondary position limiter mounted on the mounting shaft. The secondary position limiter is fixed rotationally to the mounting shaft.

According to another aspect, an outfeed assembly for a conveyor belt, comprises a sprocket mounted on a drive shaft and a position limiter assembly comprising a mounting shaft extending from a first end to a second end, a primary position limiter mounted on the mounting shaft and spaced from sprocket by a first gap and a secondary position limiter mounted on the mounting shaft and spaced from the sprocket by a second gap that is bigger than the first gap.

According to still another aspect, a position limiter assembly for a conveyor belt comprises a mounting shaft extending from a first end to a second end and having a slot in an end face for mounting the mounting shaft to a conveyor frame and a roller limiter comprising a rotatable roller mounted on the mounting shaft.

BRIEF DESCRIPTION OF THE DRAWINGS

The disclosed systems and methods can be understood with reference to the following drawings. The components in the drawings are not necessarily to scale.

DETAILED DESCRIPTION

A conveyor employs a positively-driven conveyor belt, a drive sprocket and a position limiter assembly to ensure proper engagement of the belt and drive sprocket. The position limiter may be installed, retained and removed from a shaft without the use of tools, or with minimal use of tools.

A position limiter may be used to ensure proper engagement between drive elements on a conveyor belt drive and drive elements on a conveyor belt. Position limiters are described in U.S. Pat. Nos. 7,850,562, 9,151,357, 9,296,565 and 9,555,971, the contents of which are incorporated herein by reference.

Figure 1:
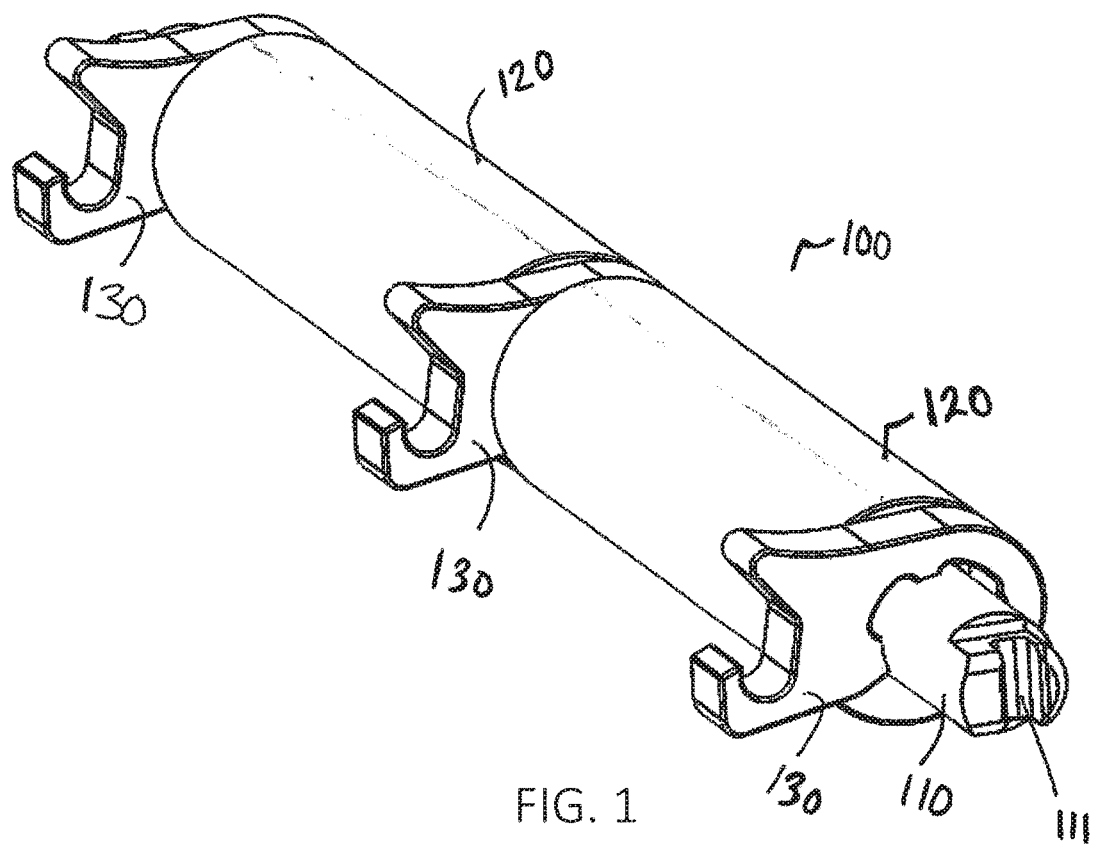
FIG. 1 is an isometric view of a position limiter assembly according to an embodiment of the invention.
Figure 2:
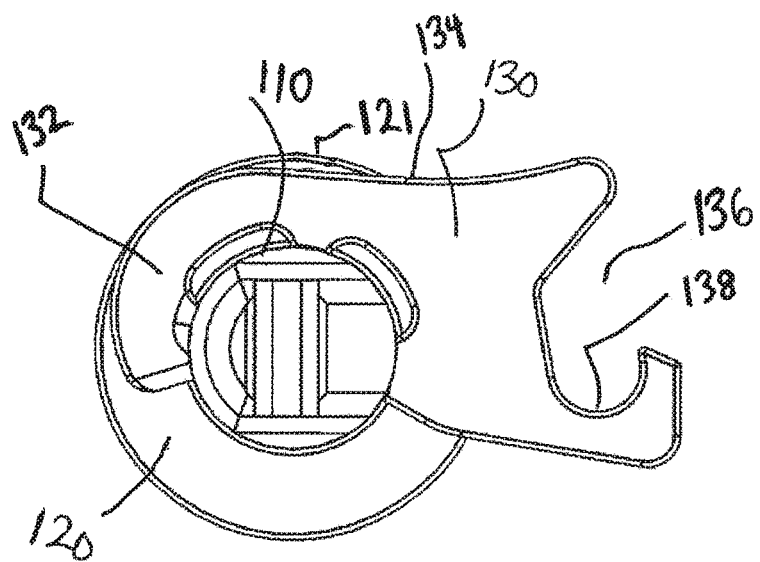
FIG. 2 is a side view of the position limiter assembly of FIG. 1.
Figure 3:
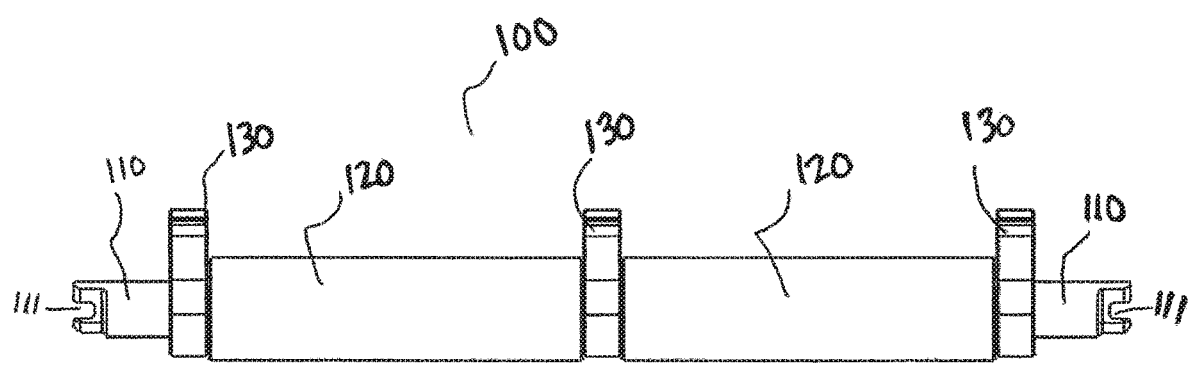
FIG. 3 is a top view of the position limiter assembly of FIG. 1.

FIGS. 1-3 show an embodiment of a position limiter assembly 100 suitable for use in a conveyor. The position limiter assembly includes a mounting shaft 110 including an array of position limiters mounted thereon. The array of position limiters includes roller limiters 120 alternating with snap-on position limiters 130 along the length of the mounting shaft. The mounting shaft 110 includes one more slots 111 in the end faces for mounting the position limiter assembly 100 in a conveyor frame. The snap-on position limiters 130 have a larger limiting surface but are spaced farther from a drive sprocket when the position limiter assembly 100 is mounted in a conveyor.

Each roller limiter 120 comprises a dynamic roller that can spin freely on the shaft 110. The roller limiters 120 can also slide on the shaft 110. The roller limiter provides a line of contact 121 for the conveyor belt. The roller limiters 120 are the primary position limiters in the assembly and serve to ensure proper engagement between drive elements on the conveyor belt drive and drive elements on the conveyor belt during normal operation.

The snap-on position limiters 130 serve as secondary or back-up position limiters in case the primary position limiters 120 fail to maintain engagement. The illustrative snap-on position limiters each comprise a snap clamp portion 132, an extended, static limiting surface 134 and a scraper mount 136. The snap-clamp portion includes a pair of legs that snap onto the shaft 110. One leg includes a tapering, inward facing tip that is received in a channel on the shaft 110 and an axial tab that fits into a slot on the shaft 110 to lock the snap-clamp position limiter to the shaft 110. The snap-on position limiters are preferably fixed axially and rotationally on the shaft 110 during operation of the conveyor, but are removable for cleaning or replacement. The illustrative limiting surface 134 provides a larger surface area for ensuring engagement between the drive teeth on the conveyor drive and the conveyor belt. The illustrative limiting surface 134 span two drive teeth of the conveyor belt to ensure controlled hand-off from one drive tooth to the next drive tooth. The scraper mount 136 forms a recess 138 for receiving a scraper mounting bar, as shown in FIG. 4.

When assembled in the conveyor, the roller limiter 120 will be separated from the sprocket by a gap that is less than a gap separating the sprocket and the snap-on position limiter 130. During normal operating, the dynamic roller limiter keeps the conveyor belt engaged at point 121.

As long as the conveyor belt remains engaged, the conveyor belt does not contact the snap-on position limiters 130, preventing wear on the snap-on position limiters. However, if an obstruction or other issue causes the belt to pull out of engagement with the sprocket in a location prior to the roller limiter line of contact 121, the snap-on position limiter 130 contacts the conveyor belt to ensure engagement of the sprocket with the conveyor belt. Because the snap-on position limiters 130 only contact the conveyor belt in the event of a disengagement of the conveyor belt before the line of contact 121, which is rare, the snap-on position limiters can be made of a high-wear material, such as acetal.

Figure 4:
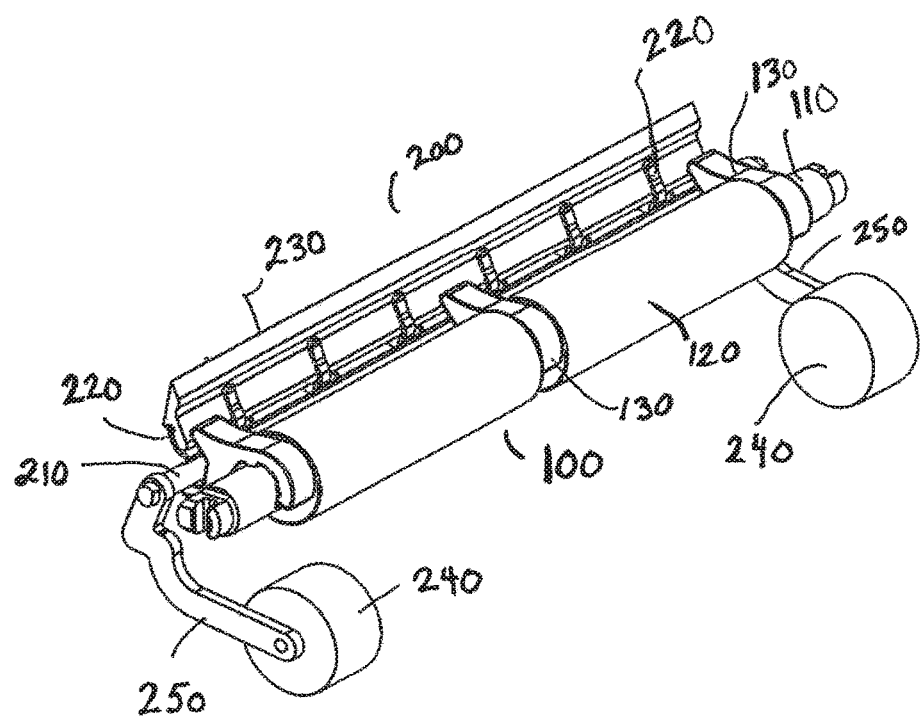
FIG. 4 is an isometric view of the position limiter assembly of FIG. 1 having a scraper assembly mounted thereon.
Figure 5:
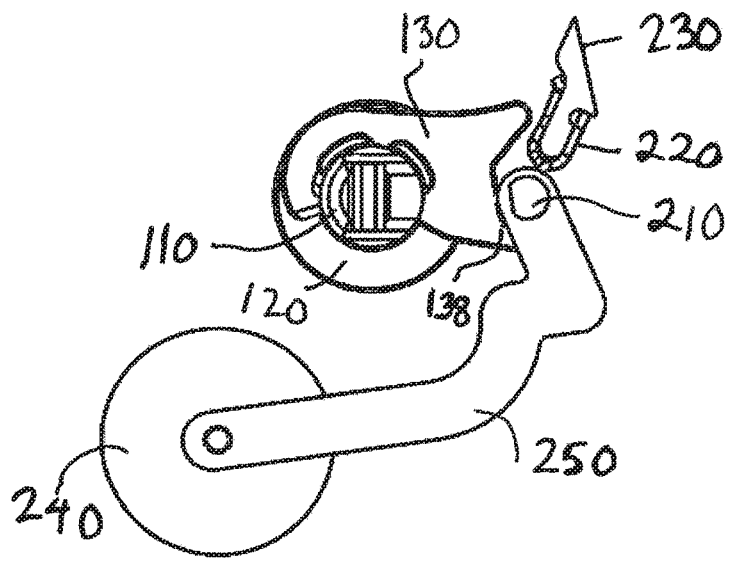
FIG. 5 is a side view of the combined assembly of FIG. 4.

The back-up snap-on position limiters 130 also may be used to mount a scraper assembly, as shown in FIGS. 4 and 5. The ability to use acetal or another high-wear material promotes the integration of the scraper mount because acetal is relatively strong. The illustrative scraper assembly 200 comprises a scraper mounting bar 210 inserted in the recesses 138 of the snap-on position limiters 130. A plurality of scraper blade receptacles 220 extend up from the scraper mounting bar 210 and a scraper blade 230 is inserted in the receptacles 220. Counter-weights 240 may be mounted to the scraper mounting bar 210 using brackets 250. The counter-weights 240 bias the scraper blade 230 into contact with the outer surface of the conveyor belt.

Figure 6:
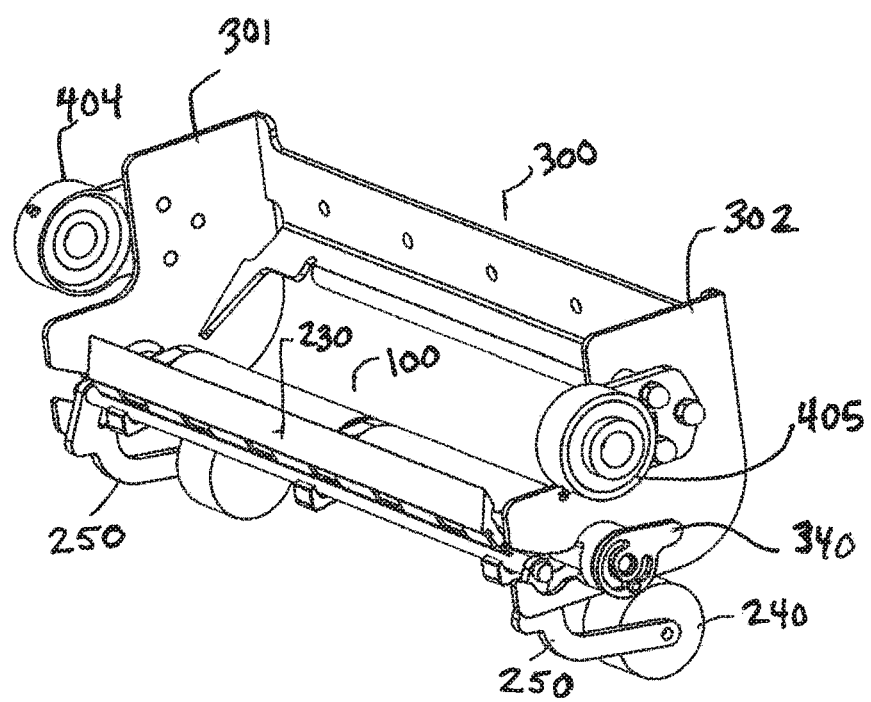
FIG. 6 is an isometric view of a conveyor frame at an outfeed end including the position limiter and scraper assemblies.
Figure 7:
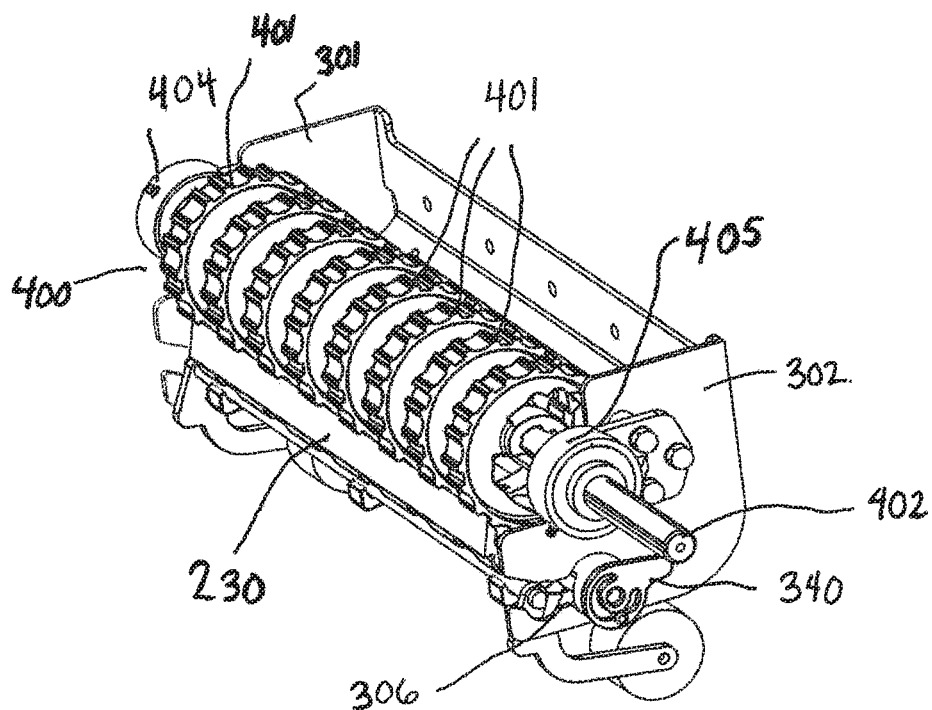
FIG. 7 shows the conveyor frame end of FIG. 6 including drive sprockets.
Figure 8:
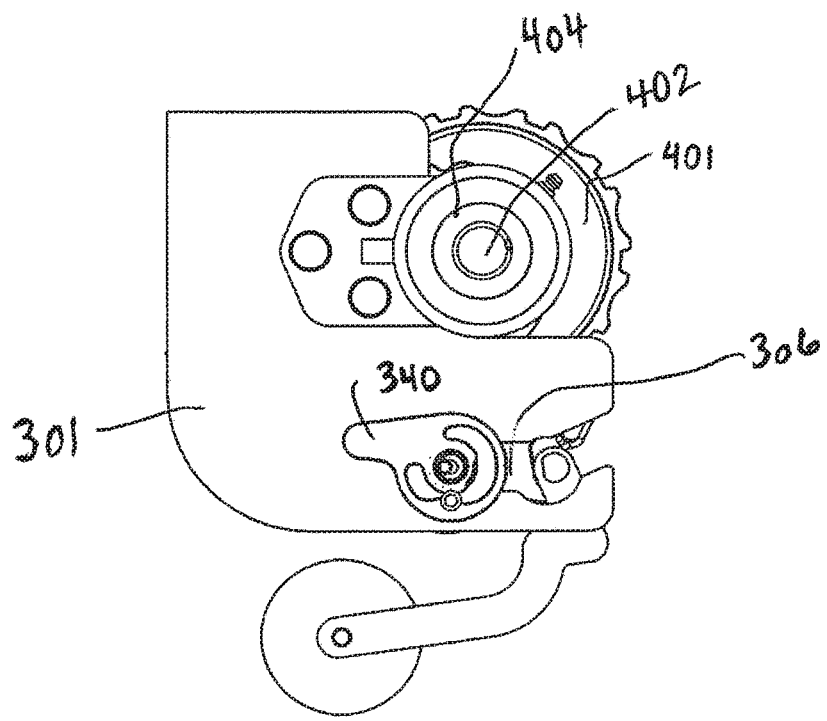
FIG. 8 is a side view of the embodiment of FIG. 7.

The position limiter assembly 100 with the scraper assembly 200 mounted thereon can be mounted to a conveyor frame 300, as shown in FIGS. 6-8. The conveyor frame 300 comprises opposing side plates 301, 302 including structure for mounting a conveyor drive 400, shown as a series of sprockets 401 mounted on a drive shaft 402 housed in bearings 404, 405 mounted to the side plates 301, 302. Each side plate 301, 302 includes an opening 306 below the drive mount for mounting the position limiter assembly 100. A handle 340 engages the mounting shaft 110 to selectively move the position limiter assembly 100 into and out of an engagement position. The handle 340 includes an offset protrusion that engages a slot 111 in the end face of the mounting bar 110. Rotation of the handle 340 pushes the mounting shaft 110 forward or rearward relative to the drive shaft 402.

The invention is not limited to the illustrative embodiments described above. For example, the position limiter assembly may omit the snap-on position limiters and include only one or more rotating roller limiters 120 on a removable mounting shaft 110.

What is claimed is:

1. A position limiter assembly for a conveyor belt, comprising:
   a mounting shaft extending from a first end to a second end;
   a roller limiter mounted on the mounting shaft, the roller limiter having a top surface forming a line of contact with the conveyor belt; and
   a snap-on position limiter mounted on the mounting shaft adjacent to the roller limiter, the snap-on position limiter having a top surface that is lower than the top surface of the roller limiter.

2. The position limiter assembly of claim 1, wherein the roller limiter freely rotates on the mounting shaft.

3. The position limiter assembly of claim 1, wherein the snap-on position limiter includes a scraper mount for mounting a scraper assembly.

4. The position limiter assembly of claim 1, wherein the snap-on position limiter has a static limiting surface for ensuring engagement between the drive teeth on the conveyor belt and a conveyor drive.

5. The position limiter assembly of claim 1, wherein the snap-on position limiter is fixed axially and rotationally relative to the mounting shaft.

6. The position limiter assembly of claim 1, wherein the first end of the mounting shaft has an end face having a first slot and the second end of the mounting shaft has an end face having a second slot.

7. A position limiter assembly for a conveyor belt, comprising:
   a mounting shaft extending from a first end to a second end;
   a primary position limiter comprising a freely-rotating roller mounted on the mounting shaft, the freely-rotating roller having a top surface forming a line of contact with the conveyor belt; and
   a secondary position limiter mounted on the mounting shaft, wherein the secondary position limiter is fixed rotationally to the mounting shaft, wherein top surface of the primary position limiter is higher than a top surface of the secondary position limiter.

8. The position limiter assembly of claim 7, wherein the wherein the secondary position limiter includes a snap clamp for mounting the secondary position limiter on the mounting shaft.

9. The position limiter assembly of claim 7, wherein the wherein the secondary position limiter includes a scraper mount for mounting a scraper assembly.

10. A position limiter assembly for a conveyor belt, comprising:
    a mounting shaft extending from a first end to a second end and having a slot in an end face for mounting the mounting shaft to a conveyor frame;
    a first roller limiter comprising a rotatable roller mounted on the mounting shaft
    a second roller limiter mounted on the mounting shaft; and
    a snap-on position limiter mounted between the first roller limiter and the second roller limiter, wherein the first and second roller limiters have top surfaces forming a line of contact with the conveyor belt that is higher than a top surface of the snap-on position limiter.

11. The position limiter assembly of claim 10, further comprising a scraper assembly mounted in a scraper mount on the snap-on position limiter.

12. The position limiter assembly of claim 10, wherein the first roller limiter freely rotates on the mounting shaft.

\* \* \* \* \*